United States Patent
Shaikh et al.

(10) Patent No.: US 6,602,545 B1
(45) Date of Patent: Aug. 5, 2003

(54) METHOD OF DIRECTLY MAKING RAPID PROTOTYPE TOOLING HAVING FREE-FORM SHAPE

(75) Inventors: Furqan Z Shaikh, Troy, MI (US); Howard Douglas Blair, Romulus, MI (US); Tsung-Yu Pan, Ypsilanti, MI (US)

(73) Assignee: Ford Global Technologies, L.L.C., Dearborn, MI (US)

( * ) Notice: Subject to any disclaimer, the term of this patent is extended or adjusted under 35 U.S.C. 154(b) by 0 days.

(21) Appl. No.: 09/624,926

(22) Filed: Jul. 25, 2000

(51) Int. Cl.⁷ .................................................. B05D 1/06
(52) U.S. Cl. ...................... 427/191; 427/201; 427/205; 419/5; 419/6; 419/8
(58) Field of Search ...................... 364/468.04; 427/191, 427/201, 205; 419/5, 6, 8

(56) References Cited

U.S. PATENT DOCUMENTS

| | | | | |
|---|---|---|---|---|
| 5,302,414 A | | 4/1994 | Alkhimov et al. | |
| 5,609,922 A | * | 3/1997 | McDonald | 427/447 |
| 5,641,448 A | * | 6/1997 | Yeung et al. | 264/401 |
| 5,872,714 A | * | 2/1999 | Shaikh et al. | 364/468.04 |
| 5,976,457 A | * | 11/1999 | Amaya et al. | 419/36 |

OTHER PUBLICATIONS

M.F. Smith, J.E. Brockman, R.C. Dykhuizen, D.L. Gilmore, R.A. Neiser, and T.J. Roemer, "Cold Spray Direct Fabrication–High Rate, Solid State, Material Consolidation" Dec. 1998, Materials Research Society.

* cited by examiner

*Primary Examiner*—Daniel J. Jenkins
(74) *Attorney, Agent, or Firm*—Brooks & Kushman P.C.; Damain Porcari

(57) ABSTRACT

A method and apparatus for directly making rapid prototype tooling from a computer model having a free-form shape. The method steps comprise essentially: (a) machining a soft metal tooling base so as to contour at least one free-form surface in conformity with the computer model; (b) cold-gas dynamic spraying the contoured surface to form superimposed impact welded metal particle layers, the layers consisting of at least one thermal management under-layer comprising primarily copper, and at least an outer wear resistant layer comprising primarily tool steel.

11 Claims, 3 Drawing Sheets

METHOD OF DIRECTLY MAKING RAPID PROTOTYPE TOOLING HAVING FREE-FORM SHAPE

BACKGROUND OF THE INVENTION

1. Technical Field

This invention relates to technology for making rapid free-form tooling and more particularly to making such tooling more wear resistant with a technique that does not require melting of metal but does follow a computer model of the tooling.

2. Discussion of the Prior Art

Direct fabrication of near-net shapes in metal, from a computer model, typically involves melting and solidification, which can cause high residual stresses, undesirable phases, poor microstructures, rough surface finish, warpage and other problems. Several prior art technologies can fabricate near-net shapes of metal and do so directly or indirectly from a computer model. One such technology is to use a laser that builds up a part by laying down successive small laser-welded beads in a computer-controlled pattern. Another technique uses directed light fabrication, others selective laser sintering. Yet others have used thermal spray deposition to build up a part by spraying molten metal droplets onto any work-piece surface, using computer-controlled masking and/or intermediate machining operations to control the pattern of the deposited material for the successive sprayed layers. Still another approach is investment casting of a part using a wax or polymeric mold pattern that is created with a computer-based process such as stereo-lithography. Although such technologies have a potential to cut time and costs for rapid prototyping, there are inherent difficulties that have hindered widespread application of such prior technological methods. All of these prior technologies involve melting and solidification. Each new layer starts out molten, solidifies, and must eventually cool to room temperature. In addition to simple dimensional changes, the resulting thermal contraction can produce significant residual stresses in the completed part and may even cause thin parts to warp. Moreover, undesirable phases or microstructures may be formed, especially at interfaces between dissimilar metals.

SUMMARY OF THE INVENTION

An object of this invention is to provide more wear resistant rapid tooling by uniquely selecting a soft metal as a tooling base and adding thereto welded layers of a thermally conductive metal and a wear resistant metal, such addition not requiring the melting of any such metals during fabrication.

The invention, in one aspect, that meets the above object, is a method of directly making rapid prototype tooling from a computer model having a free-form shape, comprising: (a) machining a soft metal tooling base so as to contour at least one free-form surface in conformity with the computer model; (b) cold-gas dynamic spraying the contoured surface to form superimposed impact-welded metal particle layers, the layers consisting of at least one thermal management under-layer comprising primarily copper, and at least an outer wear resistant layer comprising at least primarily tool steel.

DETAILED DESCRIPTION AND BEST MODE

Figure 1:
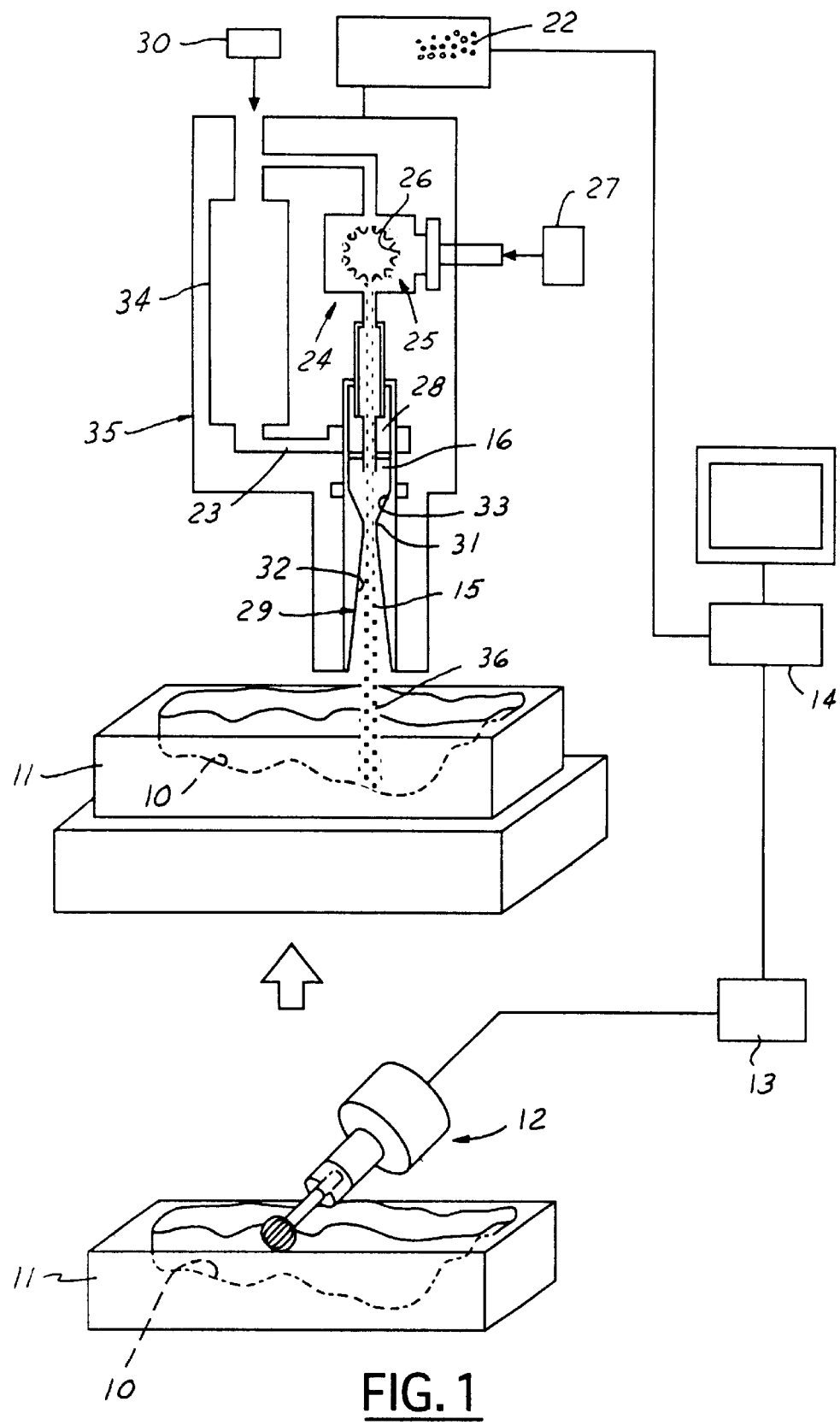
FIG. 1 is a schematic view of apparatus used to carry out certain essential steps of the inventive method.

As shown in FIG. 1, the first step of the process is to machine a free-form contoured surface 10 into a "tooling" base constituted of a soft machineable metal, such as aluminum. Machining 12, such as by milling, grinding or boring, controlled by an NC module 13, is carried out to conform with a computer software model of the part in computer 14; such machining brings the contoured surface 10 of the base to near-net shape relative to the model, allowing parts to be made from such tooling. "Tooling" is used herein to mean dies or patterns that are used repeatedly to replicate a part or other configuration by forging or casting metal against the tooling. Aluminum is preferably selected for the tooling base because: (i) it is easily machined with speed and with little effort, and (ii) it absorbs mechanical and thermal shock better than steel. Other equivalent soft metals that can be used in place of aluminum may be selected from the group comprising: copper, zinc and aluminum alloys.

Also referring to FIG. 1, a second step of the process comprises using a relatively cold gas 16 to supersonically blow powder particles 15 (having a particle size in the range of 10–50 microns) against the free-form contoured aluminum surface 10 with sufficient kinetic energy and velocity (500–1500 m/s), and in an un-melted condition, to cause plastic deformation and consolidation of the particles 15 upon impact with the surface 10 by a phenomenon analogous to explosive welding. Such cold-gas spraying eliminates undesirable influences, characteristic of the prior art, such as grain growth induced stresses, and existence of oxidation phases in the metal particles. The process allows higher deposition rates and reduces the fabrication cycle time to 1/10 that of known direct rapid tooling technologies, while allowing code-posit of dissimilar metal particles without alloying or dilution.

Different powder metal particles are applied in sequence; first, a thermal management layer 17 is deposited, in a thickness 18 of 3–10 mm, and then a wear resistant layer 19 is deposited in a thickness 20 of 5–15 microns to complete a coating 21. The thermal management layer 17 must rapidly conduct heat between the wear resistant layer and the aluminum base to carry away heat generated during use of the tooling and thereby decrease cycle time when using such tooling.

Metal particles 21 for the thermal management layer are constituted primarily of copper or copper alloy, in the particle size range of −325 microns but typically less than 22 microns, while metal particles 22 for the wear resistant layer 19 are constituted at least primarily of tool steel in a particle size range of 1–50 microns. From a practical standpoint, experience indicates that the powder particle size should be in the range of about 10–50 microns to be generally suitable for cold spray deposition. A high-pressure "bow" shock wave develops immediately adjacent to the target; this "bow shock" can begin to deflect and decelerate spray particles having a particle size below approximately 5 microns.

The particles used for the wear layer must have the following process characteristics: wear resistance, hardness and properties typical of tool steel material. Tool steel admirably meets these characteristics, but other metal powders, such as tungsten or tungsten alloys, will provide somewhat similar benefits when mixed with tool steel particles. Tool steel is defined herein to mean a steel that has a composition with the following range of ingredients, by weight percent: C 0.3–1.5; Mn 0.25–1.6; Si 0.2–2.0; W 0.5–20.0; V 0.15–4.25; Mo 0.25–8.5; Co 0.6–12.0; Cr 0.3–12.0; Ni 0.3–12.0; and the remainder iron. Preferably H13 tool steel can be used which consists of C 1.0, Mn 1.0, Si 0.6, W 10.0, V 3.0, Mo 5.0, Co 6.0, Cr 6.0, Ni 6.0, and the remainder iron.

To carry out cold-gas metal spraying, the metal powders must be propelled at a necessary speed; a compressed gas propellant 23, of helium or helium and nitrogen mixed, is used. The solid metal powder particles are put into a particle mixer and metering feeder 24 which presents a homogeneous mixture of metal particle sizes to a cylindrical drum 25; the drum has surface depressions 26 that accept a predetermined quantity of the solid metal particles for transfer according to a metal powder controller 27. The conveyed stream of metal particles is mixed with the propellant gas 23 in a ratio of gas to metal particles sufficient to transfer the particles at high velocity; the mixture is delivered to the ante-chamber 28 of a supersonic nozzle 29. By changing the percentage of particles to gas, and/or increasing the temperature of the propellant gas, the velocity of the gas/particle jet 29 exiting from the supersonic nozzle, can be varied.

With proper inlet gas pressure from a gas source 30 [i.e. 200–400 psi (2025–2700 kPa)], the gas flow velocity at the smallest internal diameter 31 of the converging/diverging nozzle 29, will be a local sonic velocity, at least mach 1. As the gas expands in the diverging section 32 of the nozzle, supersonic gas flow velocities are developed. As indicated earlier, powder particles are injected into the gas flow at the ante-chamber 28, immediately upstream of the converging section 33 of the nozzle, and are accelerated by the surrounding gas flow to proceed down the nozzle.

Figure 4:
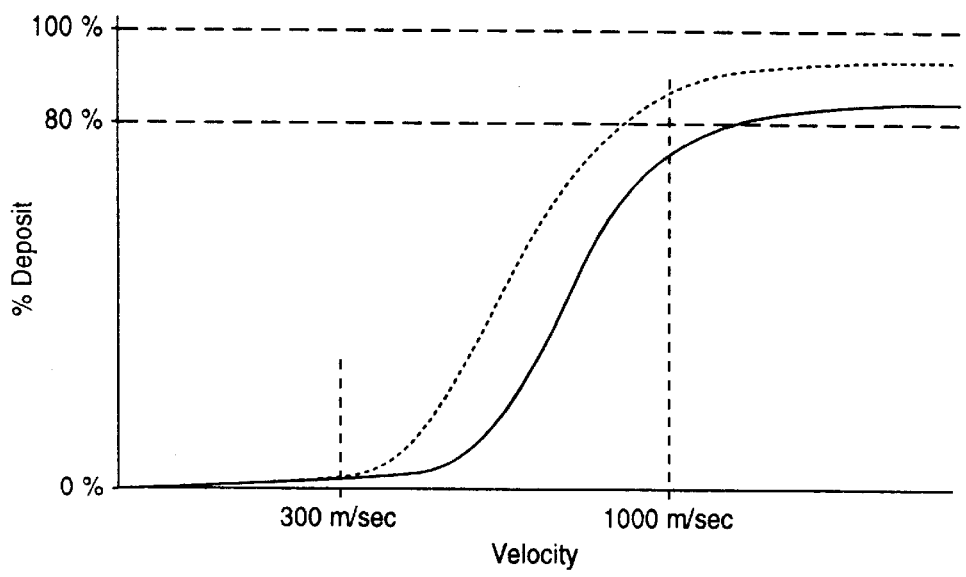
FIG. 4 is a graphical illustration showing variation of mean velocity as a function of deposition efficiency for different metal particles as propelled by the supersonic nozzle.
Figure 5:
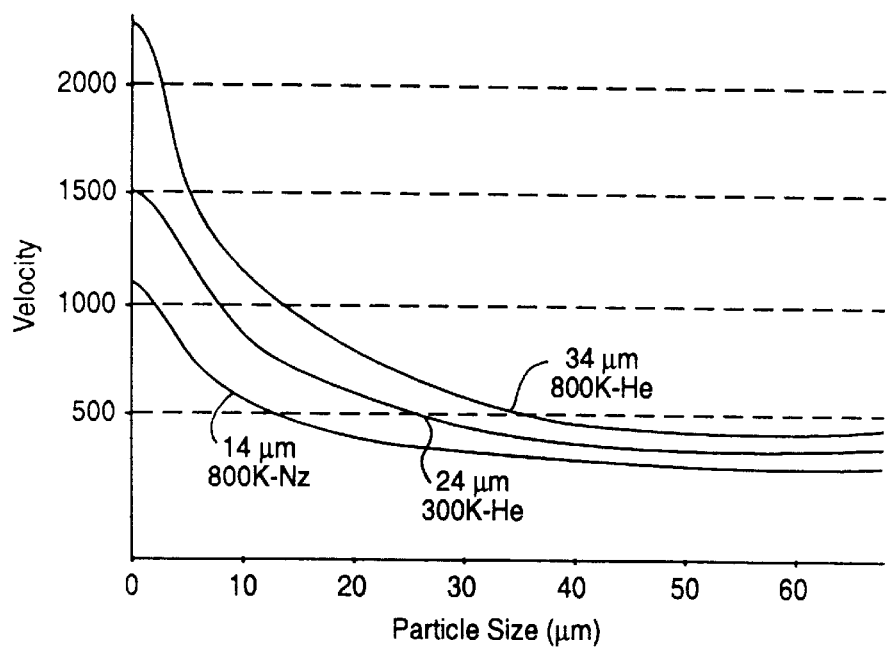
FIG. 5 is a graphical illustration of velocity, within the supersonic nozzle, as a function of particle size.
Figure 7:
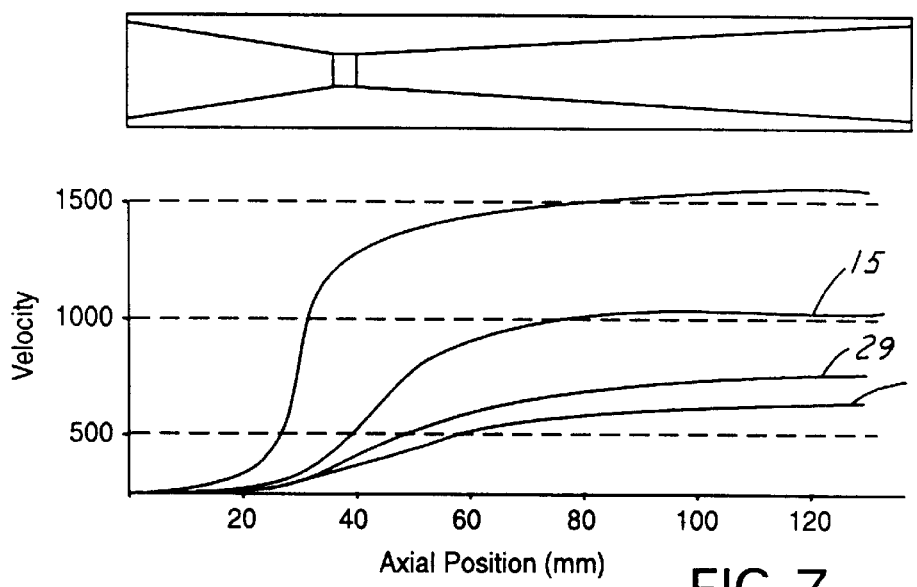
FIG. 7 is a graphical illustration depicting the degree of particle acceleration in the supersonic nozzle as a function of axial position within the nozzle.

To achieve a necessary critical particle velocity, the gas may be restricted to only helium, having a lower molecular weight, and by preheating the helium gas to reduce its density. Critical particle velocity is defined herein to mean 550–1000 meters/second (for aluminum about 650 m/sec.). This critical impact velocity varies according to the material being sprayed as a deposit, but it should be somewhere in the range of 700–1100 m/s, preferably 800–1000 m/s, to obtain an 80% deposition efficiency (see FIG. 4). To achieve the elevated velocity, gas selection, gas pressure and particle size play a role. As shown in FIG. 5, lowering the gas pressure from 600 to 300 psi, when using helium, restricts the attainable velocity to larger and larger particle sizes. Changing to pure nitrogen, at a high pressure, results in further inability to spray smaller particles with sufficient velocity. As shown in FIG. 7, larger particles do not achieve as high an exit velocity as smaller particles do, even though the gas jet is at much higher velocities.

A 16–20 kW electrical resistance heater 34 is used to preheat the helium gas up to a temperature of 400–550° C. It should be pointed out that the gas rapidly cools again as it expands and accelerates in the diverging section of the nozzle, usually at a gas flow rate of 10–20 lbs/hr. Hence, the dwell time of the solid particles in contact with the heated gas is very brief, and temperature of the particles at impact (i.e. about 50° C.) is substantially below the gas preheat temperature to reduce the heat content transferred to the substrate.

Preheating the propellant gas creates a lower gas density which tends to reduce the drag force on the particles. Even though the maximum particle velocity may ultimately be higher with preheated gas, it may take a longer distance for the particles to closely approach the gas velocity, but are not highly sensitive to the precise internal geometry of the diverging section 32 of the spray nozzle. Therefore, a single nozzle design can be effectively used for a wide range of materials. The inlet gas pressure does not affect the gas velocity; however, increasing the inlet gas pressure does increase the gas density and thus provides better coupling of the particles to increase initial particle acceleration.

Figure 2:
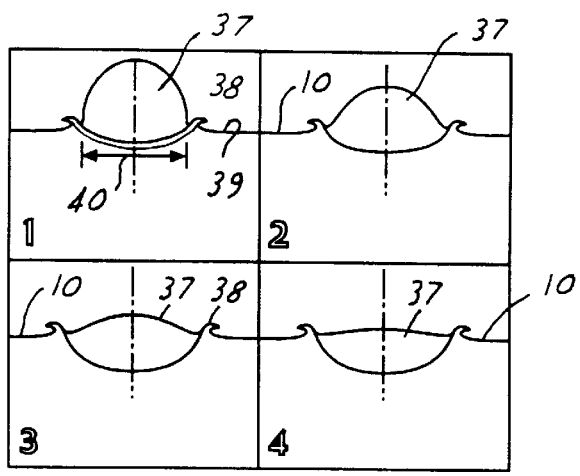
FIG. 2 is a series of enlarged schematic elevational views of a metal particle as it impacts and bonds with the contoured surface of the tooling base according to this invention.

The nozzle 29, pre-heater 34, particle feeder 24 may all be contained in an assembly 35 movable by a robot positioner 22 for traversing the spray 36 along the contoured free-form surface 10 in accordance with the computer model. As shown in FIG. 2, the supersonic spray 36, from the assembly 35, impinges on the base 11. The precise mechanism by which solid particles deform and bond to the aluminum base is evident when a minimum critical velocity for the cold spray deposition takes place. As shown in FIG. 2, a solid particle 37 of copper that has been sprayed, impacts the tooling base 11 and not only plastically deforms itself but also initially indents the surface 10 while pushing waves 38 of the aluminum base to the sides (FIG. 2-1). Plastic deformation of the incident particle, as well as the underlying surface, disrupts any thin surface aluminum oxide 38. Hence, clean metal services are always brought into intimate conformal contact at high localized impact pressures. As shown in the sequential illustrations of FIG. 2, the spherical particle, impacting a locally flat surface, ideally results in a progressively expanding circle of contact 40 that "sweeps" other surface impurities away from the particle-substrate interface. The deformation proceeds to a stage where the particle 3 ×7 merges into the surface 10 with little of the particle appearing above the surface 10 while producing essentially no porosity (i.e. 2% or less). This bonding process is similar to forge welding or explosive welding. The available energy at impact must be sufficient to cause requisite plastic deformation for such explosive welding to take place. Computational modeling and micro-structural evidence shows such plastic deformation of impacting cold-spray particles to take place with the underlying substrate. Calculated and experimental results corroborate that no local melting occurs during such cold spray conditions. Indeed, the peak local temperatures predicted are below the melting point of the metals used. A great advantage of this process is that oxygen-sensitive materials can be sprayed in an ambient-air environment without significant oxidation. Cold-sprayed copper and tool steel show no obvious oxide in the deposit and have much less porosity.

Figure 3:
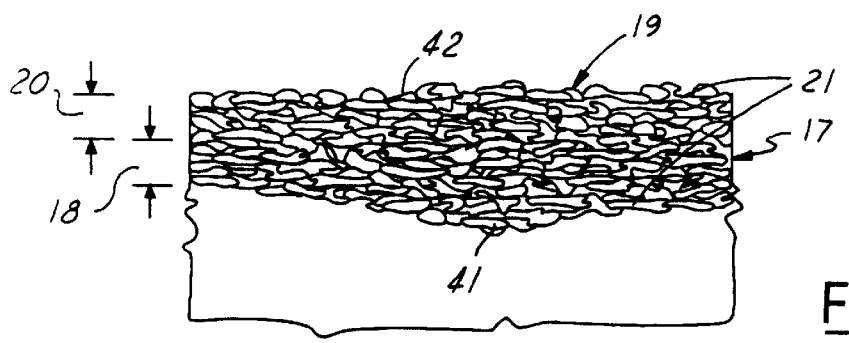
FIG. 3 is an enlarged schematic sectional view of particles deposited in layers by the cold-gas dynamic spraying step of this invention.

Turning to FIG. 3, the plastically deformed and layered particles look like "splats" under magnification. The thermal layer particle splats 41 are covered by wear resistant particle splats 42. Such "splats" in the cold-sprayed deposit show sharp angular boundaries, with no apparent evidence of localized melting, even at much higher magnifications.

Figure 6:
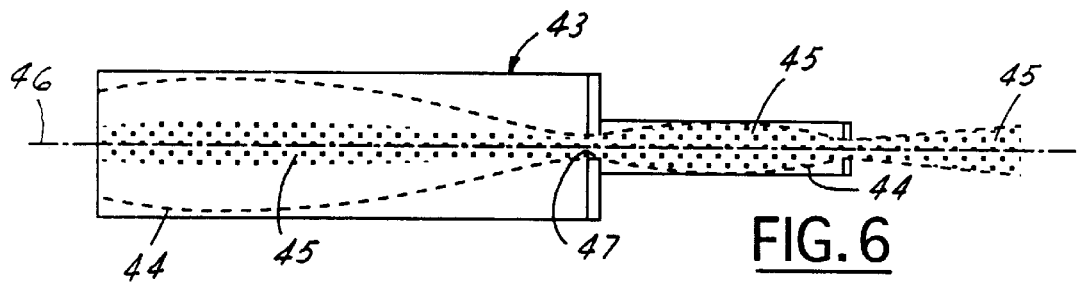
FIG. 6 is an illustration of one type of aerodynamic focusing element used with the apparatus of this invention.

If the spray of particles is concentrated to a smaller diameter, even greater detail and accuracy can be obtained in achieving a uniform wear resistant coating. To this end an aerodynamic focusing element 43 can be used upstream of the supersonic nozzle and performs essentially as a means of slowing down the particle-laden gas stream through a flow constriction as illustrated in FIG. 6. As the gas 44, carrying the solid particles 45, converges toward the centerline 46 upstream of the constriction 47, particles are accelerated toward the centerline axis by the radially inward component of the flow. As the gas decelerates radially, inertia causes the solid particles to continue to move toward the centerline. The expansion of the flow as it exits the constriction 47 is more gradual, and the particles are not strongly accelerated away from the centerline. The net result is that particles downstream of the aerodynamic focusing constriction occupy a streamline closer to the centerline than the streamline they occupied upstream of the aerodynamic constriction. The degree of focusing is determined by how much closer to the centerline is the final particle. Depending upon factors such as the flow velocity, the diameter of the constriction, gas viscosity and mass density, particle size, and the initial radial position of the solid particle, different degrees of focusing will occur. This subcritical velocity focusing can be further improved by using multiple constrictions in series, as shown in FIG. 6, to progressively move the particles closer to the central axis 46. Thus, with the aerodynamically focused powder stream and with the supersonic nozzle held at an angle, with respect to a perpendicular to the local surface, of about 0°, maximum impact and control can be obtained.

To enhance coating effectiveness as a continuous coherent and well bonded wear-resistant coating, the particles of copper and tool steel may be blended as a transient gradient between the thermal management layer of copper and the wear resistant layer of tool steel. Smaller steel particles (less than 5 microns) nest more readily with the larger copper particles (10–45 microns) to avoid any possible inter-splat boundaries to enhance the integrity of the coating.

While the best mode and viable alternatives for carrying out the invention have been described in detail, those familiar with the art to which this invention relates will recognize various alternative designs and variations for the practicing the invention as defined by the following claims.

What is claimed is:

1. Method of directly making a wear resistant article from a computer model having a free-form shape, comprising:

(a) machining a soft metal article base so as to contour at least one free-form surface conforming essentially to said computer model; and;

(b) cold-gas dynamic spraying the contoured surface to form superimposed impact-welded metal particle layers thereon, the layers consisting of at least one thermal management under-layer comprising primarily cooper, and at least one outer wear-resistant layer comprising primarily tool steel.

2. The method as in claim 1, in which spraying of step (b) is carried out to attain a critical velocity of impact in the range of 550–1000 m/sec.

3. The method as in claim 1, in which said soft metal is selected from the group consisting of copper, zinc and aluminum alloys.

4. The method as in claim 1, in which said soft metal is aluminum or an aluminum alloy.

5. The method as in claim 1, in which said under layer is deposited in a thickness of 3–10 mm and said outer layer in a thickness of at least 5–15 mm.

6. The method as in claim 1, in which in step (b) said metal particles for the thermal management layer are selected from the group consisting of copper and copper alloys, and said wear resistant metal particles are selected from tool steel compositions.

7. The method as in claim 1, in which in step (b) said cold-gas spraying is carried out by use of helium or a helium mixture as a propellant, which propellant is heated to the temperature range of 250–500° C.

8. The method as in claim 1, in which the size range of said copper particles is 5–44 microns and the size range of the wear resistant particles is 1–50 microns.

9. The method as in claim 1, in which in step (b) said spraying is carried out by use of a supersonic nozzle and that employs gas to propel the particles in a stream, and in which the copper and wear resistant particles are blended together in the spraying stream when changing from one layer to the other to create a mixed intermediate zone interfacing the layers.

10. The method as in claim 1, in which in step (b) said spraying additionally uses apparatus to aerodynamically focus the stream of particles immediately upstream of entering the supersonic nozzle to provide a more focused stream for impacting the contoured surface of the base.

11. A method of king a wear-resistant article from a computer model having a free-formed shape, said method comprising:

machining an article base to form a contoured surface conforming essentially to the computer model, said article being made of a soft metal; and cold gas dynamically spaying metal particles in an un-melted condition to form superimposed impacts-welded metal particle layers on the contoured surface, the layers consisting of at least one thermal management under-layer comprising essentially copper, and at least one outer wear-resistant layer comprising primarily tool steel.

* * * * *